(12) United States Patent
Onoue (10) Patent No.: US 7,821,573 B2
(45) Date of Patent: Oct. 26, 2010

(54) TIME SETTING SYSTEM, IMAGING DEVICE, VIDEO-DEVICE, AND TIME SETTING METHOD

(75) Inventor: Yoichi Onoue, Tokyo (JP)

(73) Assignee: Sony Corporation, Tokyo (JP)

( * ) Notice: Subject to any disclaimer, the term of this patent is extended or adjusted under 35 U.S.C. 154(b) by 1244 days.

(21) Appl. No.: 11/364,196

(22) Filed: Mar. 1, 2006

(65) Prior Publication Data

US 2006/0198605 A1    Sep. 7, 2006

(30) Foreign Application Priority Data

Mar. 4, 2005    (JP) ............................ P2005-060990

(51) Int. Cl.
*H04N 7/00* (2006.01)
*H04N 7/08* (2006.01)
*H04N 5/44* (2006.01)

(52) U.S. Cl. ...................... 348/460; 348/553; 348/552; 348/461

(58) Field of Classification Search .................. 348/552, 348/553, 510, 14.04, 460, 461; 386/46, 85; 368/10, 34, 46, 55; 725/133, 153
See application file for complete search history.

(56) References Cited

U.S. PATENT DOCUMENTS

| | | | | |
|---|---|---|---|---|
| 5,557,585 | A | * | 9/1996 | Hanai et al. ..................... 368/43 |
| 5,561,461 | A | * | 10/1996 | Landis et al. ................ 348/725 |
| 6,442,328 | B1 | * | 8/2002 | Elliott et al. ................... 386/46 |

FOREIGN PATENT DOCUMENTS

| | | |
|---|---|---|
| JP | 07-280971 | 10/1995 |
| JP | 2000-350127 | 12/2000 |
| JP | 2003-125239 | 4/2003 |
| JP | 2003-202979 | 7/2003 |
| JP | 2003-279671 | 10/2003 |
| JP | 2003-322690 | 11/2003 |
| JP | 2004-045315 | 2/2004 |
| JP | 2004-233062 | 8/2004 |
| JP | 2004-364304 | 12/2004 |

\* cited by examiner

*Primary Examiner*—David L Ometz
*Assistant Examiner*—Jean W Désir
(74) *Attorney, Agent, or Firm*—Oblon, Spivak, McClelland, Maier & Neustadt, L.L.P.

(57) ABSTRACT

An imaging device outputs video data with an image signal obtained from imaging an object, records video data onto a record medium, reproduces video data therefrom, outputs first time information from a clock section, communicates with another device through a first communication interface according to a predetermined protocol, and exchanges video data with the other device. A video-device automatically obtains second time information as reference from the outside of the video-device, processes a video signal, communicates with the other device through a second communication interface according to the protocol, and exchanges video data with the other device. When connected through the first and second communication interfaces, the video-device transmits the second time information to the imaging device. The imaging device receives the second time information and sets a time for the clock section with the received second time information.

25 Claims, 8 Drawing Sheets

| | MSB | | | | | | | LSB |
|---|---|---|---|---|---|---|---|---|
| opcode | \multicolumn{8}{c|}{TIME CODE (51h)} |
| operand[0] | \multicolumn{8}{c|}{20h} |
| operand[1] | \multicolumn{8}{c|}{FRAME} |
| operand[2] | \multicolumn{8}{c|}{SECOND} |
| operand[3] | \multicolumn{8}{c|}{MINUTE} |
| operand[4] | \multicolumn{8}{c|}{HOUR} |

Fig. 8

| VALUE | RESPONSE |
|---|---|
| 0h – 7h | Reserved for command types |
| 8h | NOT IMPLEMENTED |
| 9h | ACCEPTED |
| Ah | REJECTED |
| Bh | IN TRANSITION |
| Ch | IMPLEMENTED/STABLE |
| Dh | CHANGED |
| Eh | Reserved for future specification |
| Fh | INTERIM |

TIME SETTING SYSTEM, IMAGING DEVICE, VIDEO-DEVICE, AND TIME SETTING METHOD

CROSS REFERENCES TO RELATED APPLICATIONS

The present invention contains subject matter related to Japanese Patent Application No. 2005-060990 filed in the Japanese Patent Office on Mar. 4, 2005, the entire contents of which being incorporated herein by reference.

BACKGROUND OF THE INVENTION

1. Field of the Invention

The present invention relates to a time setting system, an imaging device, a video-device, and a time setting method that allow a date and a time to be easily set for an internal clock of a device.

2. Description of the Related Art

A portable video camera has internal calendar and clock with which a date and a time at which an image was captured can be stamped on the image when it is recorded. Since this clock uses a crystal oscillator that has high accuracy and a small error, after the current date and time have been set for the video camera, even if it has left without adjustment, the error of the clock of the video camera is small. However, although the error of the clock is small, as time elapses, the error gradually increases. In addition, while the video camera is operating, since the internal temperature of its housing rises, the oscillation frequency of the crystal oscillator varies due to changed temperature characteristics of the crystal oscillator. As a result, time of the clock deviates. In addition, as the voltage of a backup battery of the clock varies, the oscillation frequency varies and thereby time of the clock deviates.

The frequency and environment in which the video camera is used depend on the user. One user may use the video camera only several times in a year. Another professional user may use the video camera 24 hours, 365 days. Thus, the temperature, voltage, and so forth of the video camera vary when it is used. Against such various environments in which the video camera is used, it is very difficult to maintain the accuracy of the internal clock in a high level.

In the past, when the date and time of the internal clock deviated, the user manually set the date and time for the clock according to information displayed on a monitor disposed on the video camera. Related art of which a time is set for a video camera with keys according to a menu is described in Patent Document 1.

[Patent Document 1] Japanese Patent Application Unexamined Publication No. HEI 6-86107

Figure 1A:
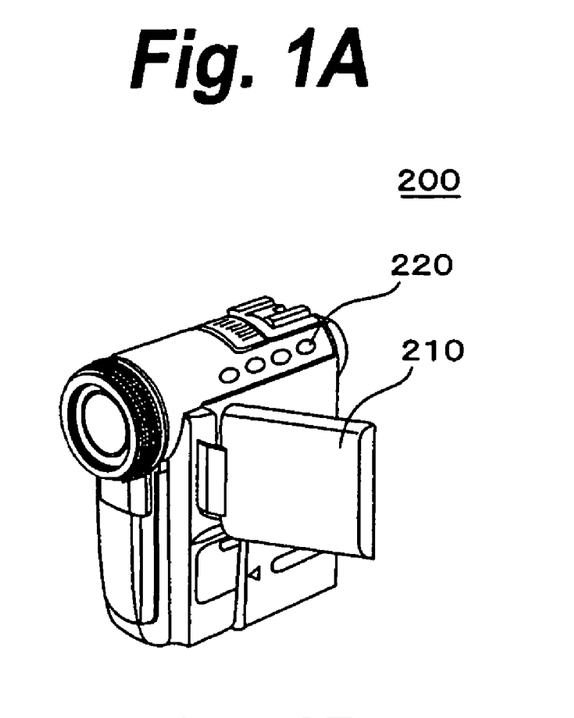
FIG. 1A and FIG. 1B are schematic diagrams showing a method of setting a time for an imaging device according to related art.
Figure 1B:
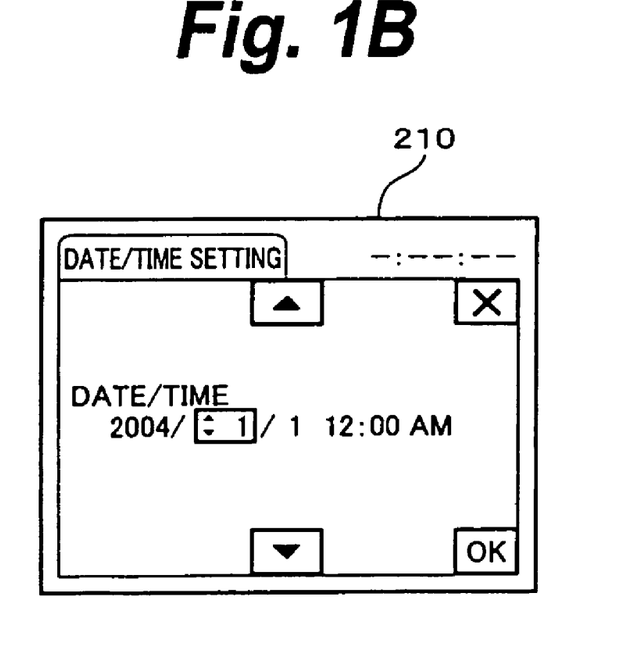

Next, with reference to FIG. 1A and FIG. 1B, an example of a method of setting a date and a time that was used in the related art will be described in brief. FIG. 1A shows an appearance of an example of a portable video camera 200. Disposed on for example an outer side surface of the portable video camera 200 is an operation section 220 that has keys with which settings and so forth of the video camera 200 are performed. A monitor 210 displays captured images, recoded images, and setting information.

When a date and a time are set for the portable video camera 200, for example with a key disposed on the operation section 220, a setting menu is displayed on the monitor 210. A date and time setting menu is selected from the setting menu. FIG. 1B shows the date and time setting screen selected from the setting menu and displayed on the monitor 210. The monitor 210 displays a screen on which items "YEAR", "MONTH", "DAY", "HOUR", and "MINUTE" are set.

When the value of each item is changed, with keys, each item for example "MONTH" is selected and a value of the selected item is selected. In such a manner, each of the other items, which are "DAY", "HOUR", and "MINUTE" of the date and time of the internal clock of the portable video camera 200 is selected and then a value of the selected item is selected. After each item is selected and the value of the selected item is selected, "OK" at the lower right of the display is pressed. As a result, the date and the time can be set for the internal clock of the portable video camera 200.

SUMMARY OF THE INVENTION

However, some users of video cameras always need accurately date and time. In addition, when a date and a time of a captured image are used as an evidence of a case, accurate date and time are needed. In this situation, in the related art, whenever the user uses the video camera, he or she needs to perform the foregoing operations to manually set a date and a time for the video camera. Thus, in the past, there was a problem of which the user needed to perform troublesome operations.

In addition, when the user manually set a date and a time for the video camera, he or she may set them for it with reference to his or her clock, a clock displayed on a television broadcast program, or a tine tone of a telephone time service. However, if there is such a clock or a service, the user cannot set a date and a time for the video camera. In addition, when the user sets a time for the video camera with reference to such a clock or a service, there will be an error between the current time and the setting time because he or she needs to set the date and time with keys while he or she is checking the time of such a clock or a service. Thus, it is difficult to accurately set a date and a time for the video camera.

In view of the foregoing, it would be desirable to provide a time setting system, an imaging device, a video-device, and a time setting method that allow an accurate time to be automatically set without user's manual time setting.

According to an embodiment of the present invention, there is provided a time setting system having an imaging device and a video-device. The imaging device has an imaging section that output video data based on an image signal obtained from imaging an object, a record and reproduction section that records video data onto a record medium and reproduces video data therefrom, a clock section that outputs first time information, and a first communication interface that communicates with another device according to a predetermined protocol. The imaging device exchanges video data with the other device through the first communication interface. The video-device has a reference time information obtainment section that automatically obtains second time information as reference information from the outside of the video-device, a video signal processing section that processes a video signal, and a second communication interface that communicates with the other device according to the predetermined protocol. The video-device exchanges video data with the other device through the second communication interface. When the imaging device and the video-device are connected through the first and second communication interfaces, the video-device transmits the second time information obtained by the reference time information obtainment section to the imaging device and the imaging device sets a time for the clock section based on the received second time information.

According to an embodiment of the present invention, there is provided a time setting method for a time setting system including an imaging device and a video-device, the imaging device that outputs video data based on an image signal obtained from imaging an object, records video data onto a record medium, reproduces video data therefrom, outputs first time information from a clock section, communicates with another device through a first communication interface according to a predetermined protocol, and exchanges video data with the other device, the video-device that automatically obtains second time information as reference information from the outside of the video-device, processes a video signal, communicates with the other device through a second communication interface according to the predetermined protocol, and exchanges video data with the other device. The time setting method is performed by, when the imaging device and the video-device are connected through the first and second communication interfaces, causing the video-device to transmit the second time information to the imaging device, and causing the imaging device to receive the second time information and set a time for the clock section based on the received second time information.

According to an embodiment of the present invention, there is provided an imaging device having an imaging section, a record and reproduction section, a clock section, and a first communication interface. The imaging section outputs video data based on an image signal obtained from imaging an object. The record and reproduction section records video data onto a record medium and reproduces video data therefrom. The clock section outputs first time information. The first communication interface communicates with another device according to a predetermined protocol. The imaging device communicates with the other device through the first communication interface, exchanges video data with the other device, receives second time information from the other device, and sets a time for the clock section based on the received second time information.

According to an embodiment of the present invention, there is provided a time setting method for an imaging device that outputs video data based on an image signal obtained from imaging an object, records video data onto a record medium, reproduces video data therefrom, outputs first time information from a clock section, communicates with another device through a first communication interface according to a predetermined protocol, and exchanges video data with the other device. The time setting method is performed by, when the imaging device is connected to the other device through the first communication interface, causing the imaging device to set a time for the clock section based on second time information received from the other device.

According to an embodiment of the present invention, there is provided a video-device having a reference time information obtainment section, a video signal processing section, and a second communication interface. The reference time information obtainment section that automatically obtains second time information as reference information from the outside of the video-device. The video signal processing section that processes a video signal. The second communication interface that communicates with the other device according to a predetermined protocol. The video-device communicates with the other device through the second communication interface, exchanges video data with the other device, and transmits the second time information obtained by the reference time information obtainment section to the other device.

According to an embodiment of the present invention, there is provided a time setting method for a video-device that automatically obtains second time information as reference information from the outside of the video-device, processes a video signal, communicates with the other device through the second communication interface according to a predetermined protocol, and exchanges video data with the other device. The time setting method is performed by, when the video-device and the other device are connected through the second communication interface, causing the video-device to transmit the second time information to the other device.

As described above, according to an embodiment of the present invention, the imaging device has an imaging section, a record and reproduction section, a clock section, and a first communication interface. The imaging section outputs video data based on an image signal obtained from imaging an object. The record and reproduction section records video data onto a record medium and reproduces video data therefrom. The clock section outputs first time information. The first communication interface communicates with another device according to a predetermined protocol. The imaging device communicates with the other device through the first communication interface, exchanges video data with the other device, receives second time information from the other device, and sets a time for the clock section based on the received second time information. Thus, when the imaging device and the video-device are connected through the first and second interfaces and video data are exchanged therebetween, the imaging device can receive the second time information from the video-device and automatically sets a date and a time for an internal clock of the imaging device based on the received second time information.

According to an embodiment of the present invention, the imaging device outputs video data based on an image signal obtained from imaging an object, records video data onto a record medium, reproduces video data therefrom, outputs first time information from a clock section, communicates with another device through a first communication interface according to a predetermined protocol, and exchanges video data with the other device. When the imaging device is connected to the other device through the first communication interface, the imaging device sets a time for the clock section based on second time information received from the other device. Thus, when the imaging device and the other device are connected and video data are executed therebetween, the imaging device receives second time information from the other device and automatically sets a date and a time of an internal clock of the imaging device according to the received second time information.

According to an embodiment of the present invention, a video-device automatically obtains second time information as reference information from the outside of the video-device, processes a video signal, communicates with the other device through the second communication interface according to a predetermined protocol, and exchanges video data with the other device. When the video-device and the other device are connected through the second communication interface, the video-device transmits the second time information to the other device. Thus, when the video-device and the other device are connected and video data are executed therebetween, the video-device transmits second time information to the other device and automatically sets a date and a time of an internal clock of the other device according to the received second time information.

According to an embodiment of the present invention, when an imaging device is connected to an external video-device that has accurate time information, since the imaging device obtains the time information therefrom, a date and a time can be automatically set for the internal clock of the imaging device.

In addition, according to an embodiment of the present invention, when an imaging device and an external video-device are connected and video data are reproduced, time information is obtained along with the video data. Thus, when a date and a time are set for the clock of the imaging device, only by connecting the imaging device and the video-device, the imaging device can obtain the time information.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

Next, an embodiment of the present invention will be described. According to this embodiment of the present invention, a portable imaging device and an external video-device are connected. When video data are transmitted from the imaging device to the video-device, the imaging device obtains time information from the external video-device and automatically sets a date and a time for an internal clock of the imaging device.

Figure 2:
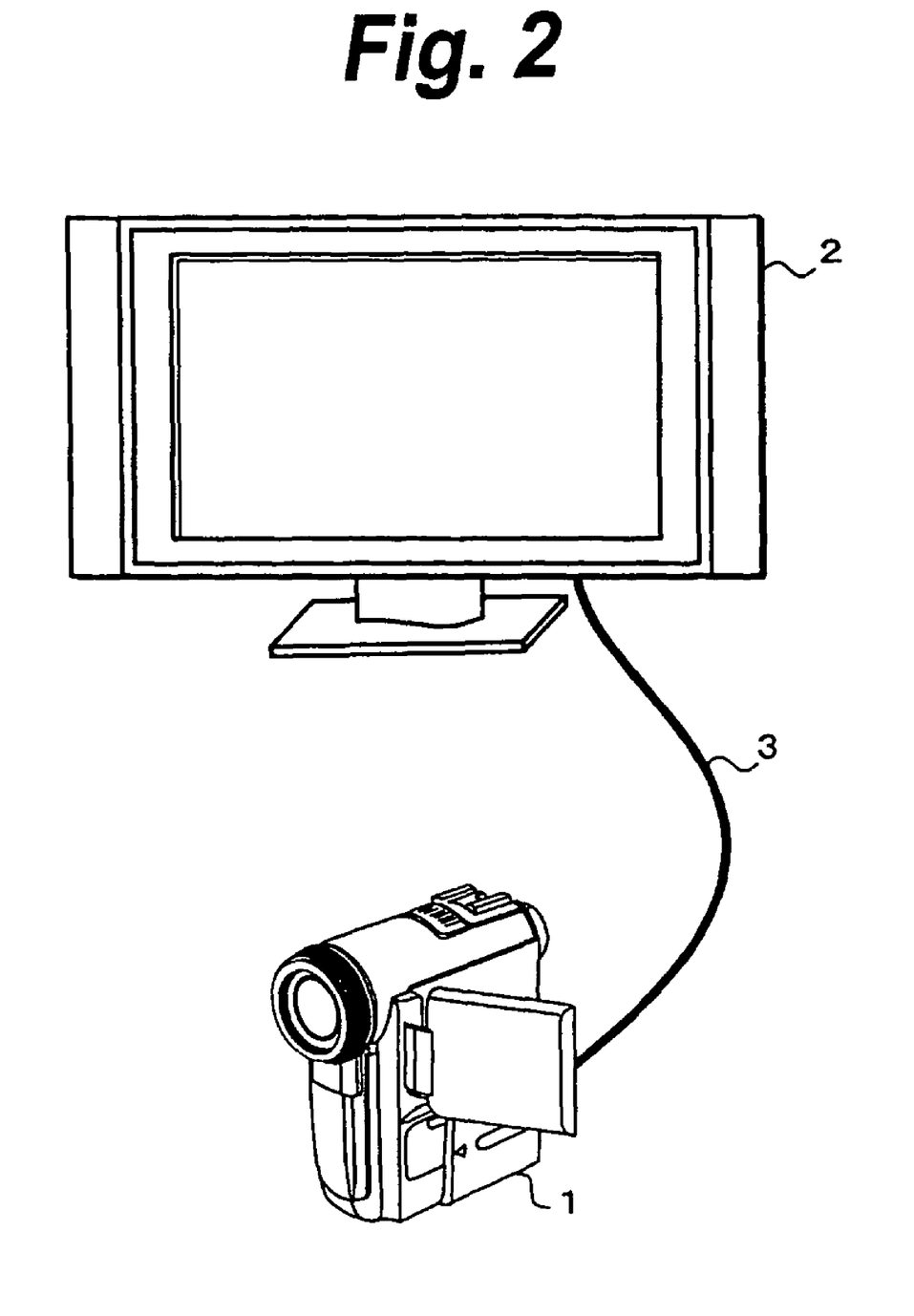
FIG. 2 is a schematic diagram showing a first example of an embodiment of the present invention.

FIG. 2 shows a first example of this embodiment of the present invention. In the example shown in FIG. 1, an imaging device 1, for example a portable video camera, and a television receiver (hereinafter sometimes referred to as the television 2) are connected through a transmission path 3. Video data are transmitted between the imaging device 1 and the television 2. The television 2 can know a current time based on time information contained in a television broadcast radio wave.

According to this embodiment of the present invention, when the imaging device 1 and the television 2 are connected through the transmission path 3 and video data are transmitted between the imaging device 1 and the television 2, not only the video data, but information with which a date and a time are set for the internal clock of the imaging device 1 is exchanged between the imaging device 1 and the television 2 through the transmission path 3. Since the video data and the information are exchanged, the imaging device 1 can set a date and a time for the internal clock thereof based on the time information received from the television 2. Thus, only connecting the imaging device 1 and the television 2 through the transmission path 3, a date and a time can be set for the internal clock of the imaging device 1.

Figure 3:
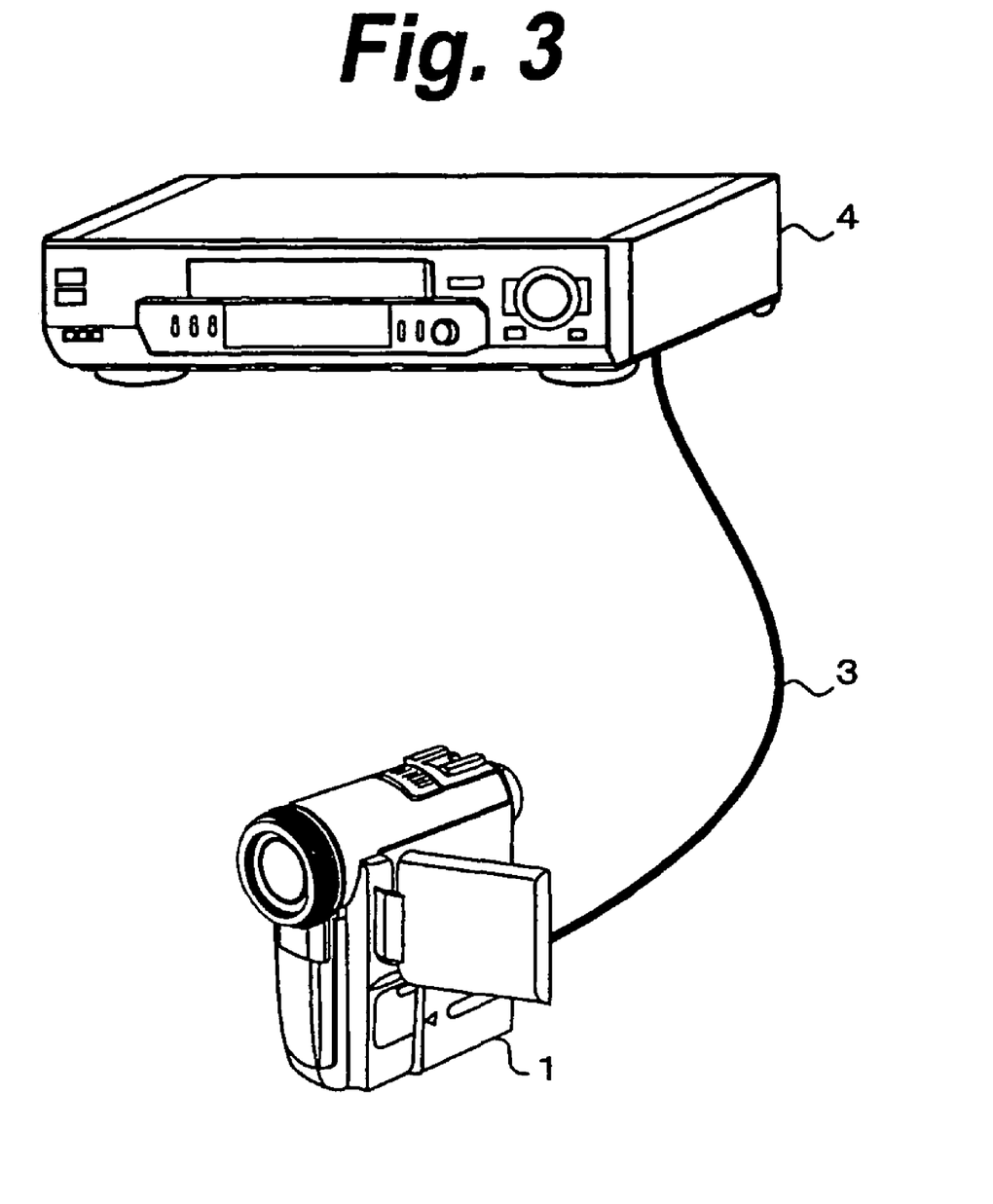
FIG. 3 is a schematic diagram showing a second example of an embodiment of the present invention.

FIG. 3 shows a second example of this embodiment of the present invention. In this example shown in FIG. 3, the imaging device 1 and a record device 4 that can record video data of a television broadcast are connected through the transmission path 3 and video data are transmitted between the imaging device 1 and the record device 4. The record device 4 can normally receive a television broadcast and obtain time information for timer recording.

In this example of this embodiment of the present invention, when the imaging device 1 and the record device 4 are connected through the transmission path 3 and video data are transmitted therebetween, not only the video data, but information with which a date and a time are set for the internal clock of the imaging device 1 is exchanged therebetween. The imaging device 1 can set a date and a time for the internal clock based on the time information received from the record device 4. Thus, only connecting the imaging device 1 and the record device 4 through the transmission path 3, a date and a time can be set for the internal clock of the imaging device 1.

The record device 4 is for example a Video Cassette Recorder (VCR) that uses a magnetic tape as a record medium, a Digital Versatile Disc (DVD) recorder that uses a recordable DVD, or a hard disk recorder that uses a Hard Disk (HD) as a record medium.

Figure 4:
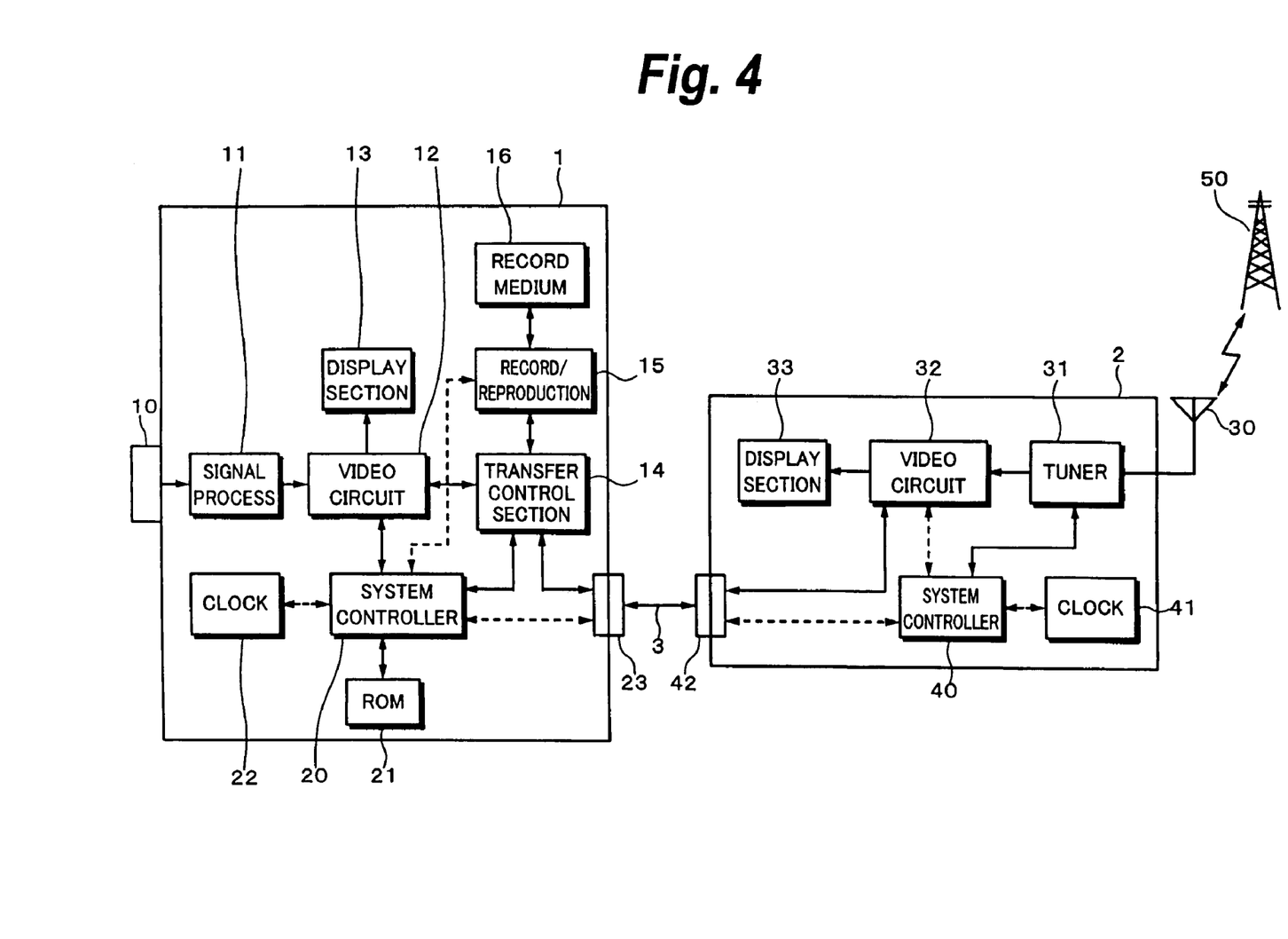
FIG. 4 is a block diagram showing an example of the structure of an imaging device and a television receiver according to an embodiment of the present invention.

Next, with reference to the accompanying drawings, an embodiment of the present invention will be described. In the following, a system that transmits video data between the imaging device 1 and the television 2 through the transmission path 3 described with reference to FIG. 2 will be described. FIG. 4 shows an example of the structure of the system according to this embodiment of the present invention. The imaging device 1 can record a video signal based on an image signal captured by an imaging section 10 onto a record medium 16. In addition, the imaging device 1 can reproduce a video signal from the record medium 16 and output the reproduced video signal to the outside of the imaging device 1 through a connection section 23.

The imaging section 10 converts light that enters an image sensor such as a Charge Coupled Device (CCD) into an image signal, performs predetermined processes such as a sampling process and a noise reduction process for the image signal, and outputs the resultant image signal. A signal processing section 11 performs predetermined signal processes such as an Auto Gain Control (AGC) process, a white balance process, a gamma (γ) compensation process, and so forth for the image signal, and obtains a video signal. In addition, the signal processing section 11 converts the video signal as an analog signal into the corresponding digital signal and outputs a base band digital video signal.

A video circuit section 12 for example compression-encodes a base-band digital video signal and decodes a compression-encoded digital video signal. When the imaging device 1 records a video signal, the video circuit section 12 compression-encodes a base-band digital video signal and outputs the compressed base-band digital video signal. When the imaging device 1 reproduces a video signal, the video circuit section 12 decodes a compressed digital video signal and outputs a decoded base-band digital video signal. The compression-encoding system is for example a system based on the Moving Picture Experts Group 2 (MPEG2) standard. Instead, the compression-encoding system may be a system based on another standard.

For example, a digital video signal is supplied from the video circuit section 12 to a display section 13. The display section 13 is used to check an image that enters from a finder and a captured image.

A transfer control section 14 matches the data transfer rates of the input and output of the video circuit section 12 with the data transfer rates of the input and output of a record and reproduction section 15 using a memory (not shown). When the imaging device 1 records video data, the transfer control section 14 temporarily writes compressed digital video data supplied from the video circuit section 12 to the memory. When the record and reproduction section 15 needs the compressed digital video data, the transfer control section 14 reads the data from the memory and supplies the data to the record and reproduction section 15. When the imaging device 1 reproduce video data, the record and reproduction section 15 temporarily writes the compressed digital video data supplied from the record and reproduction section 15 to the memory. When the video circuit section 12 needs the data, the record and reproduction section 15 reads the data from the memory and supplies the compressed digital video data to the video circuit section 12.

The record and reproduction section 15 controls for example record and reproduction operations for the record medium 16. When the imaging device 1 records video data onto the record medium 16, the record and reproduction section 15 performs predetermined processes such as an error correction encoding process and a record encoding process for data supplied from the transfer control section 14, modulates the resultant data, and records the resultant data as a modulated record signal onto the record medium 16. When the imaging device 1 reproduces video data from the record medium 16, the record and reproduction section 15 decodes a signal reproduced from the record medium 16, performs predetermined process such as a record-code decoding process and an error-correction-code decoding process for the decoded reproduction signal, and outputs the resultant signal as a digital video signal. The record medium 16 is for example a magnetic tape, an optical disc, or a hard disk, but not limited thereto. Instead, the record medium 16 may be a semiconductor memory.

A clock 22 can generate time information based on for example the oscillation frequency of a crystal oscillator at intervals of one second or one frame. In addition, a time may be set for the clock 22 based on time information supplied from the outside of the imaging device 1. The clock 22 is always driven by a battery (not shown).

A system controller 20 has for example a microprocessor that controls each section of the imaging device 1 according to a program pre-stored in a ROM 21. In addition, the system controller 20 has a Random Access Memory (RAM) (not shown) that is used as a work memory upon execution of the program.

The system controller 20 can set a time for the clock 22 based on time information that is input when the user operates an operation section (not shown) and/or time information supplied from the external video-device through a communication interface 23 that will be described later. In addition, the system controller 20 can obtain time information from the clock 22 and send the obtained time information to the video circuit section 12.

The video circuit section 12 can add time management information to video data and generate a display signal that is displayed on the display section 13 based on for example supplied time information.

A communication interface 23 performs a communication control for the external video-device connected through the transmission path 3 according to a predetermined protocol. The communication control of the communication interface 23 is performed according to commands issued from the system controller 20. The communication interface 23 performs the communication control to transfer data supplied from the transfer control section 14 and the system controller 20 to the external video-device. In addition, the communication interface 23 receives data supplied through the transmission path 3 and supplies the received data to the transfer control section 14 and the system controller 20.

Next, an example of the structure of the television 2 according to an embodiment of the present invention will be described. In this example, it is assumed that the television 2 can receive a digital television broadcast and display it. In other words, in the television 2, a tuner section 31 selects a desired channel from a digital television broadcast radio wave received from an antenna 30 and extracts a video signal from the radio wave. A video circuit section 32 processes the video signal and displays a picture based on the video signal on a display section 33.

A broadcasting facility 50 packetizes video data, audio data, and additional data added thereto for each packet and for each data type, multiplexes packetized data, and transmits them as a packet sequence called a transport stream according to definitions of for example MPEG2 systems. Data in packets may be scrambled when necessary.

Next, the transport stream will be described in brief. The transport stream is composed of Transport Stream (TS) packets. TS packets are 188-byte fixed length packets. The TS packets are composed of a TS header and a TS payload and/or an adaptation field. The TS header of the TS packets is composed of a synchronization byte with which the beginning of the TS packets is detected, an error indication that indicates whether there is a bit error in the packets, a unit start indication that indicates the beginning of new Packetized Elementary Stream (PES) packets, priority that indicates importance of the packets, a Packet Identification (PID) that indicates an attribute of the packets, and so forth. The adaptation field indicates information with respect to data of the TS payload.

The PID indicates an attribute of the packets with 13 bits. When the value of the PID is for example "0014h", it indicates that the packets are Time Date Table (TDT) packets. The TDT indicates the current date and current time. Thus, when the reception side extracts packets whose PID is "0014h", the reception side can obtain time information that indicates the current date and current time. An alphabet "h" on the right of the value indicates that the value is in hexadecimal notation. Hereinafter, when a value is in hexadecimal notation, it is accompanied by the alphabet "h".

In the television 2, the transport stream of the digital television broadcast transmitted from the broadcasting facility 50 is received by the antenna 30. The transport stream received by the antenna 30 is supplied to the tuner section 31. The tuner section 31 filters the supplied transport stream based on the value of the PID placed in the header portion of the TS packets and selects packets of a desired channel. Thereafter, the tuner section 31 reconstructs compressed video data and audio data and outputs for example compressed digital video data and compressed digital audio data. When the compressed data have been scrambled, the tuner section 31 descrambles the compressed data. In addition, the tuner section 31 filters the supplied transport stream based on the value of the PID and obtains time information therefrom. The tuner section 31 supplies the reconstructed compressed digital video data to the video circuit section 32 and the time information to a system controller 40.

The video circuit section 32 decodes for example the compressed digital video data supplied from the tuner section 31 and when necessary processes the decoded digital video data. Thereafter, the video circuit section 32 supplies the resultant data to the display section 33. The display section 33 displays data based on the output of the video circuit section 32. The display section 33 is for example a Cathode Ray Tube (CRT), a Liquid Crystal Display (LCD), or a Plasma Display Panel (PDP).

The system controller 40 has for example a microprocessor that controls each section of the television 2 according to a program pre-stored in a ROM (not shown). On the other hand, the system controller 40 has a RAM (not shown) that is used as a work memory with which the program is executed.

The clock 41 can generate time information at intervals of one second based on the oscillation frequency of the crystal oscillator. In addition, a time can be set for the clock 41 based on time information supplied from the outside of the television 2. A power is always supplied to the clock 41 so that it always operates. The system controller 40 sets a date and a time for the clock 41 based on time information supplied from the tuner section 31.

A communication interface 42 performs a communication control for the external video-device connected through the transmission path 3 according to a predetermined protocol. The communication control of the communication interface 42 is performed according to a command issued from the system controller 40. The communication interface 42 performs a communication control when data supplied from the video circuit section 32 and the system controller 40 are transferred to the external video-device. In addition, the communication interface 42 receives data from the transmission path 3 and supplies the data to the video circuit section 32 and the system controller 40.

According to this embodiment of the present invention, the communication interface 23 and the communication interface 42 are in conformity with a protocol of the Institute of Electrical and Electronic Engineers (IEEE) 1394 standard. A protocol of communication between the imaging device 1 and the television 2 may be based on the protocol of the IEEE 1394 standard.

Next, a data transfer system according to the IEEE 1394 standard will be described. The data transfer system according to the IEEE 1394 interface can transfer data at as high of up to 400 Mega bits per second (Mbps). This system allows a plurality of video streams such as MPEG2 video streams to be concurrently transferred. In addition, this system can transfer non-compressed video streams. There are two types of data transfer systems that are asynchronous transfer system and isochronous transfer system. An overall bandwidth is shared by these two transfer systems.

The asynchronous transfer system allows data to be securely transferred. This transfer system is composed of a request sub-action of which the transmission side device transfers a command and data to the reception side device and a response sub-action of which the reception side device sends a completion status back to the transmission side device. Whenever data are transferred, they are acknowledged (Ack). When the transmission side device failed to transfer data, the reception side device requests the transmission side device to retransmit the data. A control command and data that do not need to be successively transmitted are transferred according to this asynchronous transfer system. According to the IEEE 1394 standard, the asynchronous transfer system uses at least 20% of the overall bandwidth.

According to the asynchronous transfer system, data are transferred as asynchronous packets having a predetermined packet size. The packet size of asynchronous packets depends on the transfer rate. When the transfer rate of data is 400 Mbps, the transfer data size is up to 2048 Bytes.

The isochronous transfer system is a packet data transfer system of which packet data are temporally managed. In the isochronous transfer system, the transmission side device transmits data to the reception side device at intervals of a predetermined period. The reception side device does not send a reply back to the transmission side device. Thus, in this isochronous transfer system, even if an error occurs, data are not assured. Data that need to be transferred in real time such as a video stream are transferred according to this isochronous transfer system.

Data transferred according to the isochronous transfer system are transferred as isochronous packets split in a predetermined size. The packet size of isochronous packets depends on an effective bandwidth.

Data are cyclically transferred in a period of 125 µs. In this period, data are asynchronously and isochronously transferred. The data asynchronously and isochronously transferred are managed with gaps. Data are isochronously transferred after an isochronous gap period elapses, which indicates a predetermined period. Likewise, data are asynchronously transferred after a sub-action gap period elapses, which indicates a predetermined period. When no data have been transferred for a predetermined time period, one transfer cycle is complete and the next transfer cycle starts. In addition, since the isochronous gap is shorter than the sub-action gap, data that are isochronously transferred is prioritized.

Figure 5:
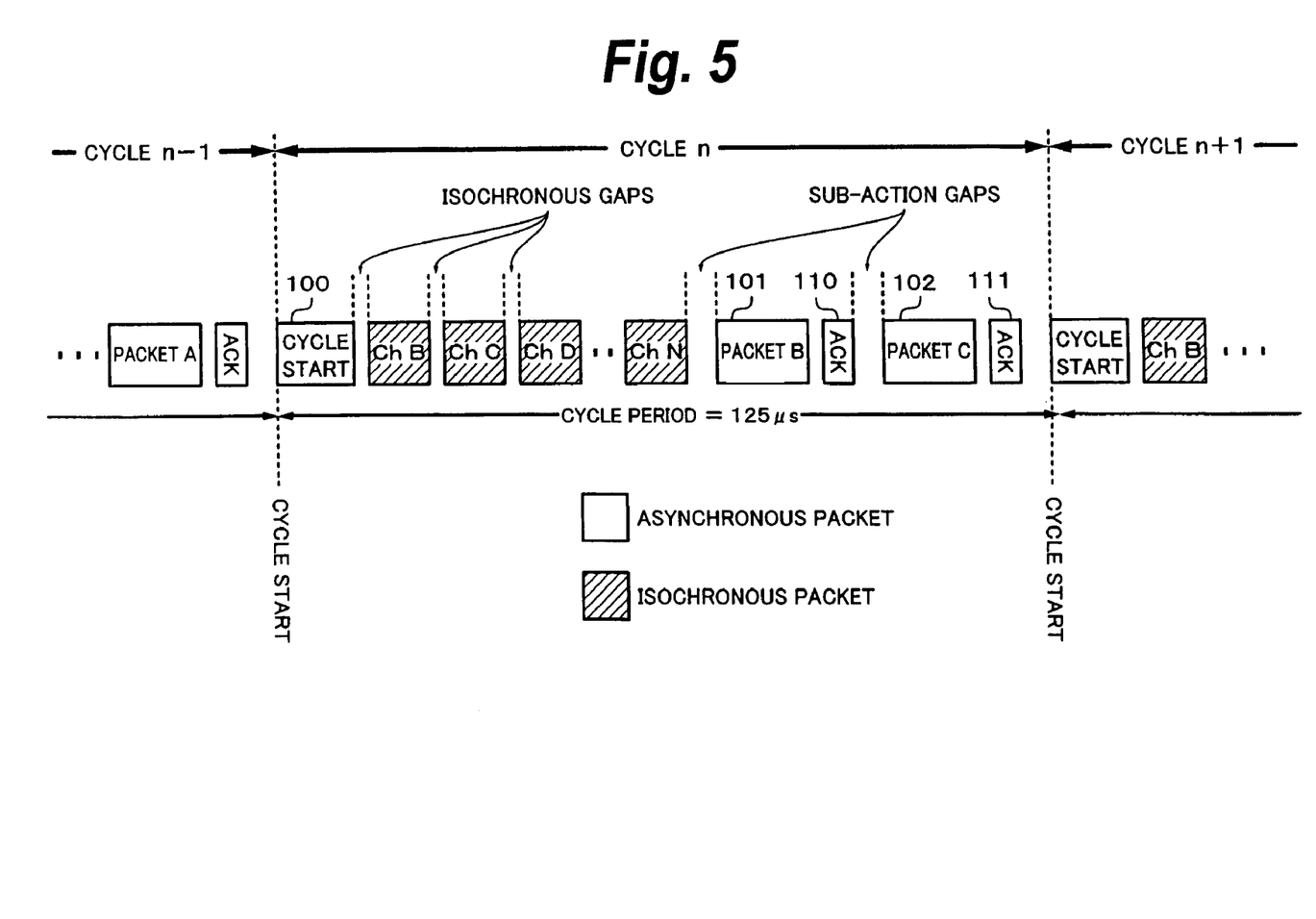
FIG. 5 is a schematic diagram showing a data transfer system according to the IEEE 1394 protocol.

FIG. 5 shows an example of data that are asynchronously and isochronously transferred according to the IEEE 1394 standard. In FIG. 5, hatched packets indicate isochronous packets that are isochronously transferred. Next, with reference to the example shown in FIG. 5, a data transfer method will be described. First, a cycle start packet 100 is transmitted. After an isochronous gap period has elapsed, the transmission side device splits compressed digital video data in a predetermined size, packetizes the data in isochronous packets of channel B (ch B) to channel N (ch N), and transmits the isochronous packets.

After the isochronous packets have been transmitted, when a sub-action gap is detected, an asynchronous packet B 101 that contains a command issued from the transmission side device is transmitted. When the reception side device receives the asynchronous packet B 101 from the transmission side device, the reception side device sends an Acknowledge (Ack) packet 110 indicating the reception status of the asynchronous packet B 101 back to the transmission side device. After a sub-action gap period has elapsed, the transmission side device transmits the next asynchronous packet C 102. When the reception side device receives the asynchronous packet C 102, the reception side device sends an Ack packet 111 based on the asynchronous packet C 102 back to the transmission side device.

After data have been isochronously transferred in one cycle, data are asynchronously transferred. After data are isochronously transferred, data are asynchronously transferred. Thus, data can be securely isochronously transferred.

In such a manner, asynchronously transferred data and isochronously transferred data share the overall bandwidth. According to this embodiment of the present invention, when the imaging device 1 and the television 2 are connected through the transmission path 3 and digital video data are transmitted therebetween according to the IEEE 1394 standard, digital video data are isochronously transferred therebetween and time information is asynchronously transferred from the television 2 to the imaging device 1. The imaging device 1 can automatically set a date and a time for the clock 22 based on the time information that has been asynchronously transferred.

Next, with reference to FIG. 6, a flow of a process of an automatic time setting function according to an embodiment of the present invention will be described. Next, like the first example shown in FIG. 2, it is assumed that the imaging device 1 is connected to the television 2 and a time is set for the imaging device 1. Since this embodiment of the present invention can be applied to the second example shown in FIG. 3, detailed description for the second example will be omitted.

Figure 6:
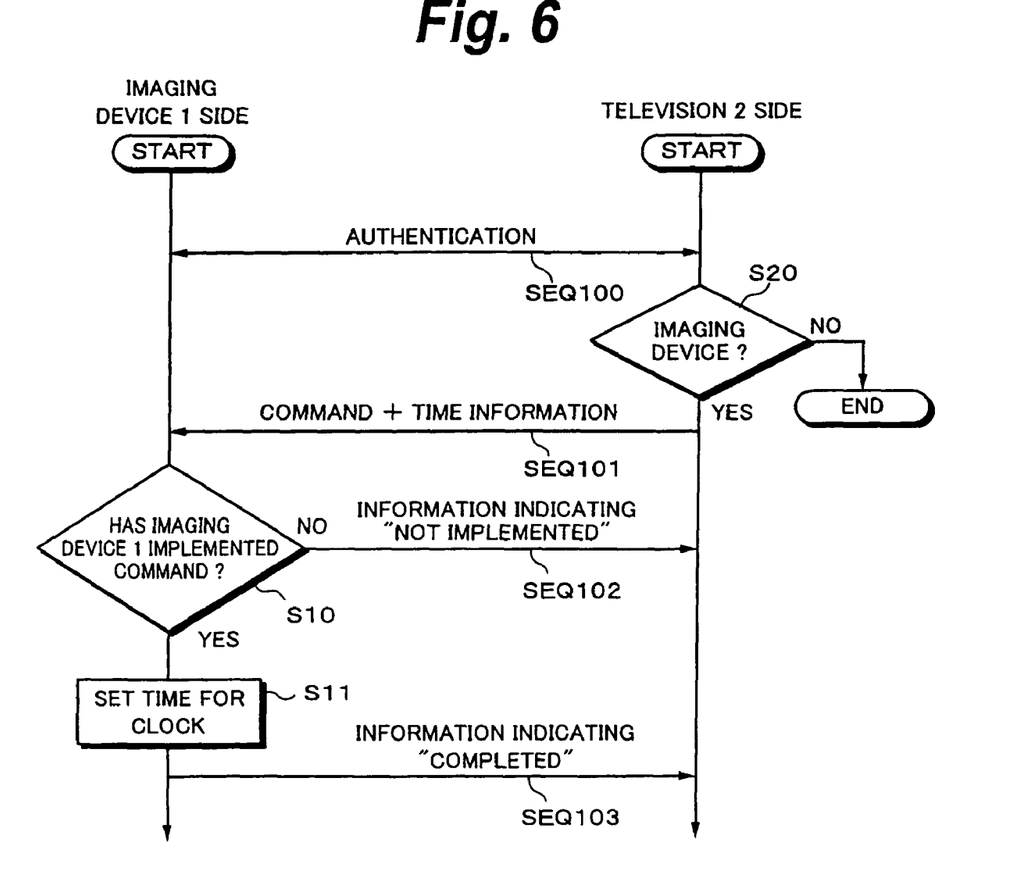
FIG. 6 is a flow chart showing an automatic time setting process according to an embodiment of the present invention.

The left side of FIG. 6 indicates a process that the system controller 20 of the imaging device 1 performs. The right side of FIG. 6 indicates a process that the system controller 40 of the television 2 performs. First, it is assumed that before a sequence of processes is performed, the television 2 side has set a time for the clock 41 based on time information contained in a radio wave received from the broadcasting facility 50.

When the user connects the imaging device 1 and the television 2 through the transmission path 3 and operates the imaging device 1 to reproduce video data and display them on the television 2, the imaging device 1 and the television 2 authenticate each other according to the IEEE 1394 standard (at SEQ 100).

After the imaging device 1 and the television 2 have authenticated each other, the imaging device 1 transfers digital video data to the television 2. Even if the imaging device 1 does not reproduce video data and/or audio data, the imaging device 1 always transfers some data to the television 2. Instead, data may be transferred from the television 2 to the imaging device 1.

At step S20, the system controller 40 of the television 2 determines whether the connected video-device is the imaging device 1 that has implemented the automatic time setting function according to this embodiment of the present invention based on the authenticated result at SEQ 100. When the determined result indicates that the connected video-device is not the imaging device 1 that has implemented the automatic time setting function according to this embodiment of the present invention, the sequence of processes is completed. In contrast, when the determined result indicates that the connected video-device is the imaging device 1 that has implemented the automatic time setting function according to this embodiment of the present invention, the system controller 40 transmits time information that indicates a current time and a command that causes the time information for the imaging device 1 side to the imaging device 1 from the communication interface 42 through the transmission path 3 (hereinafter, this command is referred to as the time setting command) (at SEQ 101).

The time information that indicates the current time and the time setting command, which have been transmitted at sequence SEQ 101, are obtained by the communication interface 23 and supplied to the system controller 20. When the system controller 20 receives the time setting command, the flow advances to step S10. At step S10, the system controller 20 determines whether the imaging device 1 has implemented the time setting command. The determination of whether the imaging device 1 has implemented the time setting command depends on whether the imaging device 1 can interpret the command.

When the determined result indicates that the imaging device 1 has implemented the time setting command, the flow advances to step S11. At step S11, the imaging device 1 sets a date and a time for the internal clock 22 based on the time information transferred along with the time setting command. After the imaging device 1 has set a date and a time for the clock 22, the imaging device 1 sends response data that indicates that the date and time have been set for the clock 22 back to the television 2 through the communication interface 23 and the transmission path 3 (at SEQ 103). After that, the sequence of processes is completed.

When the determined result at step S10 indicates that the system controller 20 has not implemented the command received at sequence SEQ 101, the imaging device 1 sends response data that indicates that the imaging device 1 has not implemented the command back to the television 2 under the control of the system controller 20 (at SEQ 102). Thereafter, the sequence of processes is completed.

In the second example shown in FIG. 3, only by replacing the television 2 with the video recorder 4, the automatic time setting method according to this embodiment of the present invention can be applied. In this case, the video recorder 4 basically has the same structure as the television 2 except that the display section 33 is removed and a record section is connected to the video circuit section 32.

Next, with reference to FIG. 7 and FIG. 8, the time information that indicates a current time and the time setting command applicable at sequences SEQ 102 and SEQ 103 explained in FIG. 6 will be described.

The IEEE 1394 standard defines formats of various commands. For example, the IEEE 1394 standard defines a command that searches for a position on a record medium with time designated. In this example, this command defines a command "TIME CODE" as "opcode" that indicates an operation of a command with eight bits. This command also defines "frame", "second", "minute", and "hour" as "operand [1]" to "operand[4]", respectively, with eight bits each. Thus, this command allows time information to be represented as frames. In this command, value [20h] of "operand[0]" indicates a search operation.

Figure 7:
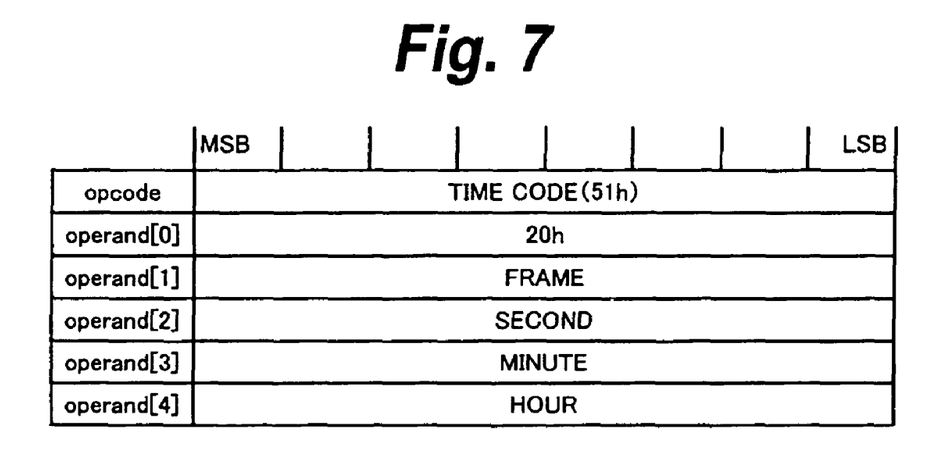
FIG. 7 is a schematic diagram showing a format of a command that searches for a position on a record medium with a time designated.

According to this embodiment of the present invention, as the time setting command at sequence SEQ 101 shown in FIG. 6, a new command may be defined, for example a time setting command "SET TIME") in the format of the command "TIME CODE" shown in FIG. 7. For example, a value of "opcode" has been defined for various commands. Thus, when a new command is defined, a non-used value needs to be defined. For example, as values of "operand[0]" to "operand [2]", "second", "minute", and "hour" are defined. As values of "operand[3]" and "operand[4]", "day" and "month" are defined.

Since the time setting command is defined in such a manner, "month: day: hour: minute: second" can be designated as time information. In this format, a date and a time would be set for the internal clock of the imaging device 1.

The command format would not be limited to such an example, but various modifications. For example, values of "operand[2]" to "operand[4]" of the time setting command are "second", "minute", and "hour". A date may be defined with another command. Instead, a year may be set.

Figure 8:
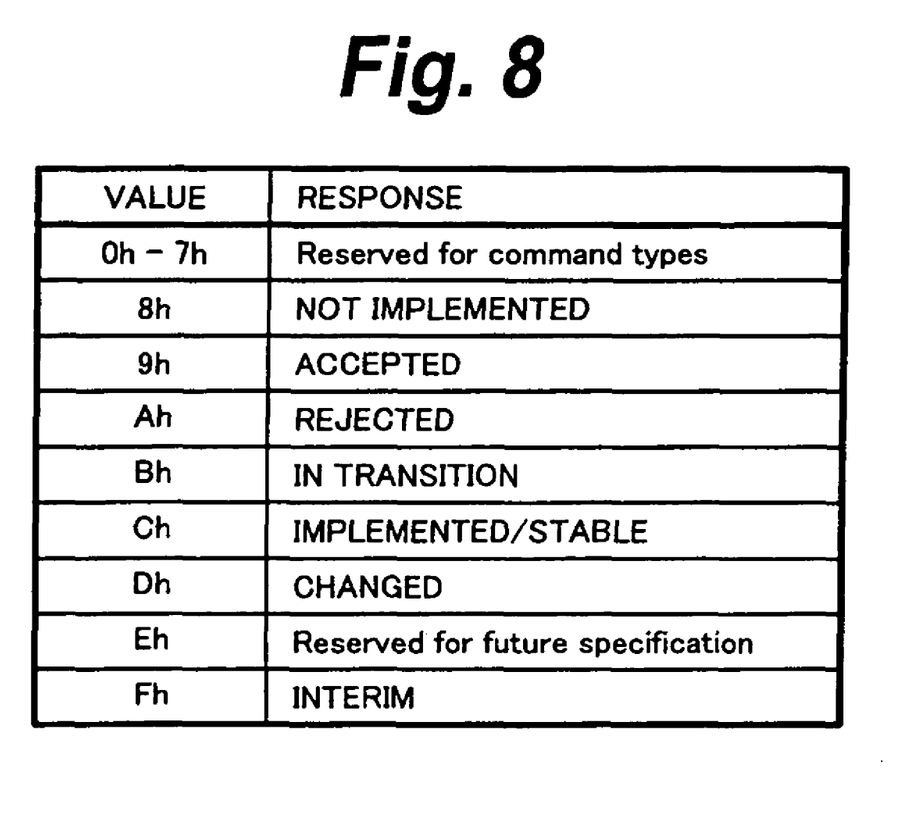
FIG. 8 is a schematic diagram showing a list of responses against commands issued from an external video-device.

FIG. 8 is a table of responses to commands issued from the external video-device according to the IEEE 1394 standard. There are a plurality of commands issued from the external video-device, including commands that control the video-device and commands that ask the video-device about it status. These responses are assigned to these commands.

Response "NOT IMPLEMENTED" indicates that the command has not been implemented. Response "ACCEPTED" indicates that the command has been executed. Response "REJECTED" indicates that the command has not been executed. Response "IN TRANSITION" indicates that the status of the device is in transition. Response "IMPLEMENTED" indicates that the command has been implemented. Response "STABLE" indicates that the status of the device is stable, not in transition. Response "CHANGED" indicates that the status of the device has changed. Response "INTERIM" indicates that the command is being executed. These responses are identified with values of four bits, each.

In the table of responses shown in FIG. 8, four types of responses "NOT IMPLEMENTED", response "ACCEPTED", response "REJECTED", and response "INTERIM" can be assigned as responses to the time setting command "SET TIME" according to this embodiment of the present invention.

For instance, according to this embodiment of the present invention, in the example shown in FIG. 6, at sequence SEQ 101, the imaging device 1 receives the time setting command "SET TIME" from the television 2. When the system controller 20 has determined that the imaging device 1 has implemented this command, the flow advances to step S11. At step S11, the system controller 20 interprets the time setting command "SET TIME" and sets a time for the clock based on the time information. As the response "COMPLETED" at sequence SEQ 103, the imaging device 1 sends for example the response "ACCEPTED" to the television 2 under the control of the system controller 20.

In contrast, when the determined result at step S10 indicates that since the imaging device 1 has not implemented the time setting function, it has not implemented the time setting command "SET TIME", the system controller 20 cannot interpret this command. Thus, at sequence SEQ 102, the system controller 20 of the imaging device 1 sends for example the response "NOT IMPLEMENTED" to the television 2.

The present invention is not limited to the foregoing embodiments. Various modifications and ramifications may be made without departing from the spirit of the present invention. For example, a video recorder, a DVD recorder, or a hard disk recorder may be used instead of the television 2. In other words, when the imaging device 1 is connected to the video-device having the time setting function through the transmission path 3, the imaging device 1 can obtain time information therefrom and set a date and a time for the clock 22 based on the obtained time information.

In the foregoing example, the imaging device 1 and the television 2 are connected through the transmission path 3 according to the IEEE 1394 standard. However, the present invention is not limited to such an example. For instance, the IEEE 1394 standard may be replaced with Universal Serial Bus (USB) 2.0 standard. The USB 2.0 standard accomplishes a high speed data transfer rate of 480 Mbps and allows data that need to be temporally managed and data that does not need to be temporally managed to be mixedly transferred. Thus, the USB 2.0 standard can be applied to the connection between the imaging device 1 and the television 2. In other words, as long as the data transfer rate is high enough to transfer compressed digital video data and data that need to be temporally managed and transferred in real time and data that do not need to be temporally managed and transferred in real time can be mixedly transferred, another standard may be applied instead of the IEEE 1394 standard.

In the foregoing description, the imaging device 1 transfers video-device to the television 2 and obtains time information therefrom. However, the present invention is not limited to this example. For instance, when the imaging device 1 does not transfer video-device to the television 2, the imaging device 1 can obtain time information therefrom.

In addition, in the foregoing example, the television 2 was described as a television that can receive a digital television broadcast. However, the present invention is not limited to this example. For instance, the television 2 may be a television that can receive an analog television broadcast. In this case, a time can be set for the internal clock of the television based on a time tone contained in a predetermined channel of the television broadcast.

In addition, the imaging device 1 and the television 2 are connected non-wirelessly, but not limited thereto. Instead, the imaging device 1 and the television 2 may be connected wirelessly. For instance, since the imaging device 1 normally has an infrared reception section that allows a remote control commander to remotely control the imaging device 1, the imaging device 1 and the television 2 may be communicated with infrared rays. However, in this case, the transmission side video-device needs to have a function that communicates data with another device using infrared signals.

In addition, for instance, the communication interface 23 and the communication interface 42 may be wireless communication data transfer interfaces that communicate with a device using a radio wave.

It is more preferred that a function that informs the user that a time has been set for the imaging device 1 upon completion of the time setting at step S11 shown in FIG. 6 being provided. For example, a message or a mark that informs the user that the time setting has been completed may be displayed on the display section 13. Instead, a display device such as an Light Emitting Diode (LED) may be disposed on an outer side surface of the imaging device 1 so that lighting or blinking of the display device informs the user that the time setting has been completed. In addition to the display device, for example beep sound may inform the user that the time setting has been completed. Instead, only sound may inform the user that the time setting has been completed.

The display indicating such information is controlled by the system controller 20. When the display section informs the user of the completion of the time setting, after the system controller 20 informs the user of the completion of the time setting at sequence SEQ 103 shown in FIG. 6, the system controller 20 generates a display control signal that causes the display section to display a message or a mark that informs the user of the completion of the time setting and supplies the display control signal to the video circuit section 12. The video circuit section 12 combines the digital video data supplied to the display section 13 and the display control signal and displays the combined data on the display section 13.

In addition, the imaging device that has an independent date and time display section may display a mark that informs the user of the completion of the time setting.

In addition, the television 2 may be capable of displaying a message or a mark that informs the user of the completion of the time setting. For example, when the system controller 40 of the television 2 is informed at sequence SEQ 103 shown in FIG. 6, the system controller 40 generates a display control signal that causes the display section 33 to display the message or mark that informs the user of the completion of the time setting and supplies the display control signal to the video circuit section 32. The video circuit section 32 causes the display section 33 of the television 2 to display the message or mark with an On Screen Display function or the like of the television 2.

When the time setting has not been performed for the imaging device 1 for a predetermined time period for example one month, a message or a mark that prompts the user to set a time for the clock with time information may be displayed on the display section 13. For example, the imaging device 1 may be provided with a battery backup memory. The memory may store a date and a time that have been set for the imaging device 1 manually or automatically according to the sequence of processes shown in FIG. 5. When the imaging device 1 is started up or the user operates the operation section, the system controller 20 compares a current time that the clock 22 has obtained and a time stored in the memory. When the compared result indicates that the difference between these times exceeds a predetermined time period, the system controller 20 causes the display section 13 to display information that prompts the user to set a time for the clock 22.

After a time is set for the imaging device 1, if the imaging device 1 is connected to the video-device that has the time setting function according to an embodiment of the present invention without a long delay, it is supposed that the time of the clock 22 of the imaging device 1 does not largely deviate.

Thus, in such a case, the automatic time setting according to an embodiment of the present invention may not be omitted. For example, the imaging device 1 may be provided with a battery backup memory. The memory may store a date and a time that has been set for the clock manually or automatically according to the sequence of processes shown in FIG. 6. The system controller 20 compares a time at which the imaging device 1 was connected to the video-device that has the automatic time setting function according to an embodiment of the present invention and a time stored in the memory. When the compared result indicates that the difference between these times is within a predetermined time period, the processes after step S10 are omitted on the imaging device 1 side shown in FIG. 6.

In addition, the user may not care about deviation of a time or may not use the time function. Thus, the user may be capable of deciding whether to perform the processes after step S10 of the imaging device 1 side shown in FIG. 6.

In addition, when two imaging devices are connected and they have determined that they each have the automatic time setting function according to an embodiment of the present invention, one imaging device whose clock has been set for a time most recently may transmit time information to the other imaging device so that the latest time is automatically set for the clock of the other imaging device. For example, each imaging device may be provided with a battery backup memory so that it stores a time that has been manually or automatically set. When the imaging devices are connected to each other, they communicate with each other to exchange times that have been set with time information stored in the memory of each imaging device and compare them. When the compared result indicates that the time stored in the memory of one imaging device is later than the time stored in the memory of the other imaging device, a date and a time are set for the clock of the other imaging device based on time information of the first imaging device.

In addition, when the imaging device 1 is connected to the video-device that has the automatic time setting function according to an embodiment of the present invention and time information that is largely different from a date and a time that have been set for the clock of the imaging device 1, the user may be capable of deciding to set a time for the clock. For example, when the imaging device 1 is connected to a video-device that has the automatic time setting function and that is used for example in his or her overseas travel, there may be a large difference between a time that has been set for the clock of the imaging device 1 and a time of time information received from the video-device that is used in his or her travel due to a time difference. The user may or may not want to set a time for the clock at site. In this case, it is preferred that the user be capable of deciding to perform the automatic time setting.

In addition, when a function that transmits and receives region data and country data along with time information is added, the time difference can be compensated.

In addition, when times have been set for the clock at least twice, an elapsed time after the last time setting until the present and a time error before and after the time setting may be stored. A function that predicts and compensates an error at the present time based on the stored information may be provided. With this function, even if the video-device does not have the automatic time setting function or when the time setting has not been performed for a long time, a time can be more accurately set for the clock. When the number of times of the time setting is increased, the accuracy of the correction of the error can be improved.

It should be understood by those skilled in the art that various modifications, combinations, sub-combinations and alternations may occur depending on design requirements and other factors insofar as they are within the scope of the appended claims or the equivalents thereof.

What is claimed is:

1. A time setting system, comprising:
an imaging device including,
record and reproduction means for recording video data onto a record medium and reproducing video data therefrom,
clock means for outputting first time information, and
a first communication interface that communicates with another device according to a predetermined protocol,
wherein the imaging device exchanges video data with the other device through the first communication interface; and
a video-device including,
reference time information obtainment means for automatically obtaining second time information as reference information from the outside of the video-device,
video signal processing means for processing a video signal, and
a second communication interface that communicates with the other device according to the predetermined protocol,
wherein the video-device exchanges video data with the other device through the second communication interface,
wherein when the imaging device and the video-device are connected through the first and second communication interfaces, the video-device transmits the second time information obtained by the reference time information obtainment means to the imaging device and the imaging device sets a time for the clock means based on the received second time information,
wherein the imaging device stores third time information that indicates a time that has been set for the clock means based on the second time information in storage means, and
wherein the imaging device compares the third time information stored in the storage means with the first time information that has been outputted from the clock means and that indicates a current time and when the compared result indicates that a difference between the third time information stored in the storage means and the first time information indicating the current time exceeds a predetermined time, the imaging device prompts the user to set a time for the clock means.

2. The time setting system as set forth in claim 1, wherein when the imaging device and the video-device are connected and the video data is exchanged therebetween, the video-device transmits the second time information to the imaging device.

3. The time setting system as set forth in claim 1, wherein the video-device further includes:
a tuner that receives a television broadcast radio wave, selectively obtains a video signal of a predetermined channel from the received radio wave, and outputs the video signal to the video signal processing means,
display means for displaying the video signal outputted from the video signal processing means,
wherein the reference time information obtainment means is disposed in the tuner and obtains the second time information from the television broadcast radio wave.

4. The time setting system as set forth in claim 1, wherein the video-device further includes:
a tuner that receives a television broadcast radio wave, selectively obtains a video signal of a predetermined channel from the received radio wave, and outputs the video signal to the video signal processing means, and
record and reproduction means for recording video data onto a record medium and reproducing video data therefrom,
wherein the reference time information obtainment means is disposed in the tuner and obtains the second time information from the television broadcast radio wave.

5. The time setting system as set forth in claim 1, wherein when the imaging device and the video-device are connected through the first and second communication interfaces, the imaging device and the video-device authenticate each other, the video-device determines whether the connected device is the imaging device based on the authenticated result, and when the determined result indicates that the connected device is the imaging device, the video-device transmits the second time information to the imaging device.

6. The time setting system as set forth in claim 1, wherein the video-device transmits the second time information to the imaging device and transmits a command to the imaging device to cause it to set a time for the clock means based on the second time information.

7. The time setting system as set forth in claim 1, wherein after the imaging device sets a time for the clock means based on the second time information, the imaging device informs the user that the time setting for the clock means has been completed.

8. The time setting system as set forth in claim 7, wherein the imaging device informs the user that the time setting for the clock means has been completed by display means of the imaging device.

9. The time setting system as set forth in claim 7, wherein the imaging device informs the user that the time setting for the clock means has been completed by transmitting information indicating that a time has been set for the clock means to the video-device and causing display means of the video-device to display the information received by the video-device.

10. The time setting system as set forth in claim 7, wherein the imaging device further includes:
audio informing means for informing the user of audio information, and
wherein the imaging device informs the user that the time setting for the clock means has been completed by the audio informing means.

11. The time setting system as set forth in claim 1, wherein the imaging device compares the third time information stored in the storage means with fourth time information indicating a time at which the imaging device and the video-device were connected and when the compared result indicates that a difference between the third time information stored in the storage means and the fourth time information indicating a time at which the imaging device and the video-device were connected is within a predetermined time, the imaging device does not set a time for the clock means.

12. A time setting method for a time setting system including an imaging device and a video-device, the imaging device records video data onto a record medium, reproduces video data therefrom, outputs first time information from a clock, communicates with another device through a first communication interface according to a predetermined protocol, and exchanges video data with the other device, the video-device that automatically obtains second time information as reference information from the outside of the video-device, processes a video signal, communicates with the other device through a second communication interface according to the predetermined protocol, and exchanges video data with the other device, the time setting method comprising the steps of:
when the imaging device and the video-device are connected through the first and second communication interfaces, causing the video-device to transmit the second time information to the imaging device;
causing the imaging device to receive the second time information and set a time for the clock based on the received second time information; and
storing third time information that indicates a time that has been set for the clock based on the second time information in a storage device,
comparing by the imaging device the third time information stored in the storage means with the first time information that has been outputted from the clock means and that indicates a current time and when the compared result indicates that a difference between the third time information stored in the storage means and the first time information indicating the current time exceeds a predetermined time, the imaging device prompts the user to set a time for the clock.

13. An imaging device, comprising:
record and reproduction means for recording video data onto a record medium and reproducing video data therefrom;
clock means for outputting first time information, and
a first communication interface that communicates with another device according to a predetermined protocol,
wherein the imaging device communicates with the other device through the first communication interface, exchanges video data with the other device, receives second time information from the other device, and sets a time for the clock means based on the received second time information,
the imaging device stores third time information that indicates a time that has been set for the clock means based on the second time information in a storage device, and the imaging device compares the third time information stored in the storage means with the first time information that has been outputted from the clock means and that indicates a current time and when the compared result indicates that a difference between the third time information stored in the storage means and the first time information indicating the current time exceeds a predetermined time, the imaging device prompts the user to set a time for the clock means.

14. The imaging device as set forth in claim 13, wherein after the imaging device sets a time for the clock means based on the second time information, the imaging device informs the user that the time setting for the video-device has been completed.

15. The imaging device as set forth in claim 14, wherein the imaging device informs the user that the time setting for the video-device has been completed using display means of the imaging device.

16. The imaging device as set forth in claim 14, wherein the imaging device informs the user that the time setting for the video-device has been completed by transmitting information indicating that a time has been set for the clock means to the other device and causing display means of the other device the information received by the other device.

17. The imaging device as set forth in claim 14, further comprising:
    audio informing means for informing the user of audio information,
    wherein the imaging device informs the user that the time setting for the clock means has been completed by the audio informing means.

18. The imaging device as set forth in claim 13, wherein the imaging device compares the third time information stored in the storage device with fourth time information indicating a time at which the imaging device and the other device were connected and when the compared result indicates that a difference between the third time information stored in the storage device and the fourth time information indicating a time at which the imaging device and the other device were connected is within a predetermined time, the imaging device does not set a time for the clock means.

19. A time setting method for an imaging device that records video data onto a record medium, reproduces video data therefrom, outputs first time information from clock, communicates with another device through a first communication interface according to a predetermined protocol, and exchanges video data with the other device, the time setting method comprising the step of:
    when the imaging device is connected to the other device through the first communication interface, causing the imaging device to set a time for the clock based on second time information received from the other device; and
    storing in a storage device third time information that indicates a time that has been set for the clock based on the second time information,
    wherein the imaging device compares the third time information stored in the storage device with the first time information that has been outputted from the clock and that indicates a current time and when a compared result indicates that a difference between the third time information stored in the storage device and the first time information indicating the current time exceeds a predetermined time, the imaging device prompts the user to set a time for the clock.

20. A video-device, comprising:
    reference time information obtainment means for automatically obtaining second time information as reference information from the outside of the video-device,
    video signal processing means for processing a video signal, and
    a second communication interface that communicates with the other device according to a predetermined protocol,
    wherein the video-device communicates with the other device through the second communication interface, exchanges video data with the other device, and transmits the second time information obtained by the reference time information obtainment means to the other device and an imaging device,
    wherein the imaging device stores third time information that indicates a time that has been set for a clock means based on the second time information,
    wherein the imaging device compares the third time information stored in a storage device with the first time information that has been outputted from the clock and that indicates a current time and when the compared result indicates that a difference between the third time information stored in the storage device and the first time information indicating the current time exceeds a predetermined time, the imaging device prompts the user to set a time for the clock means.

21. The video-device as set forth in claim 20, wherein the video-device transmits the second time information to the other device connected through the second communication interface and transmits a command to the other device to cause it to set a time for clock means of the other device based on the second time information.

22. The video-device as set forth in claim 20, further comprising:
    a tuner that receives a television broadcast radio wave, selectively obtains a video signal of a predetermined channel from the received radio wave, and outputs the video signal to the video signal processing means; and
    display means for displaying the video signal outputted from the video signal processing means,
    wherein the reference time information obtainment means is disposed in the tuner and obtains the second time information from the television broadcast radio wave.

23. The video-device as set forth in claim 20, further comprising:
    a tuner that receives a television broadcast radio wave, selectively obtains a video signal of a predetermined channel from the received radio wave, and outputs the video signal to the video signal processing means, and
    record and reproduction means for recording video data onto a record medium and reproducing video data therefrom,
    wherein the reference time information obtainment means is disposed in the tuner and obtains the second time information from the television broadcast radio wave.

24. A time setting method for a video-device that automatically obtains second time information as reference information from the outside of the video-device, processes a video signal, communicates with the other device through the second communication interface according to a predetermined protocol, and exchanges video data with the other device, the time setting method comprising the step of:
    when the video-device and the other device are connected through the second communication interface, causing the video-device to transmit the second time information to the other device and an imaging device, wherein the imaging device stores third time information that indicates a time that has been set for a clock based on the second time information in a storage device, and the imaging device compares the third time information stored in the storage device with the first time information that has been outputted from the clock and that indicates a current time and when the compared result indicates that a difference between the third time information stored in the storage device and the first time information indicating the current time exceeds a predetermined time, the imaging device prompts the user to set a time for the clock.

25. A time setting system, comprising:

an imaging device including, a record and reproduction mechanism that records video data onto a record medium and reproduces video data therefrom, a clock configured to output first time information, a first communication interface that communicates with another device according to a predetermined protocol, wherein the imaging device is configured to exchange video data with the other device through the first communication interface; and a video-device that includes a processor configured to automatically obtain second time information as reference information from outside of the video-device, a video signal processor configured to process a video signal, and a second communication interface that communicates with the other device according to the predetermined protocol, wherein the video-device exchanges video data with other devices through the second communication interface, wherein the imaging device and video-device are connected through the first and second communication interfaces, the video-device transmits the second time information obtained by the processor to the imaging device, and the imaging device sets a time for the clock based on the received second time information, the imaging device is configured to store third time information that indicates a time that has been set for the clock based on the second time information in a storage device, and the imaging device is configured to compare the third time information stored in the storage device with the first time information that has been outputted from the clock and that indicates a current time when a compared result indicates that a difference between the third time information stored in the storage device and the first time information indicating the current time exceeds a predetermined time, the imaging device prompts a user to set a time for the clock.

* * * * *